(12) United States Patent
Persson et al.

(10) Patent No.: US 9,214,804 B2
(45) Date of Patent: Dec. 15, 2015

(54) OVERLOAD DETECTION IN A SWITCHED MODE POWER SUPPLY

(75) Inventors: Oscar Persson, Kalmar (SE); Mikael Appelberg, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 207 days.

(21) Appl. No.: 13/885,040

(22) PCT Filed: Nov. 11, 2010

(86) PCT No.: PCT/EP2010/067282
§ 371 (c)(1),
(2), (4) Date: Jul. 24, 2013

(87) PCT Pub. No.: WO2012/062367
PCT Pub. Date: May 18, 2012

(65) Prior Publication Data
US 2013/0294111 A1    Nov. 7, 2013

(51) Int. Cl.
H02M 3/335    (2006.01)
H02H 7/12    (2006.01)
H02M 1/32    (2007.01)

(52) U.S. Cl.
CPC .............. *H02H 7/1213* (2013.01); *H02M 1/32* (2013.01); *H02M 3/33507* (2013.01)

(58) Field of Classification Search
CPC ... H02M 3/33507; H02M 1/32; H02H 7/1213

USPC ........................................................... 363/16
See application file for complete search history.

(56) References Cited

U.S. PATENT DOCUMENTS

| 5,847,950 | A | * | 12/1998 | Bhagwat | ......................... 363/78 |
| 7,995,359 | B2 | * | 8/2011 | Djenguerian et al. | ..... 363/21.12 |
| 2003/0002233 | A1 | | 1/2003 | Usui | |
| 2006/0018136 | A1 | * | 1/2006 | Takahashi | .................. 363/21.15 |

FOREIGN PATENT DOCUMENTS

WO    WO2011/056539 A1    5/2011

* cited by examiner

*Primary Examiner* — Emily P Pham
*Assistant Examiner* — Htet Kyaw

(57) ABSTRACT

A switched mode power supply includes a switching device, the switched mode power supply being operable to convert an input voltage ($V_{in}$) to an output voltage ($V_{out}$) by switching the switching device, and a voltage regulator operable to generate a feedback signal based on at least one of the output voltage and an output current of the switched mode power supply. The power supply further comprises an overload detector, which is arranged to receive the feedback signal and operable to determine whether the feedback signal is outside a predetermined range. If the feedback signal is outside the predetermined range, the overload detector is operable to determine that the switched mode power supply is in an overload state, and when an overload state is determined, perform control to place the switched mode power supply in a non-operational state.

12 Claims, 8 Drawing Sheets

OVERLOAD DETECTION IN A SWITCHED MODE POWER SUPPLY

TECHNICAL FIELD

The present invention generally relates to the field of switched mode power supplies (sometimes referred to as switch mode supplies or switching mode power supplies) and more specifically to overload detection in a switched mode power supply.

BACKGROUND

The switched mode power supply (SMPS) is a well-known type of power converter, which has a diverse range of applications by virtue of its small size and weight, and also its typically high efficiency. For example, switched more power supplies are often used in personal computers and portable electronic devices such as cell phones. An SMPS achieves these advantages by switching a switching device such as a power MCSFET at a high frequency (usually tens to hundreds of kHz), with the frequency or duty cycle of the switching being adjusted using a feedback signal to convert an input voltage to a desired output voltage. An SMPS may take the form of a rectifier (AC/DC converter), a DC/DC converter, a frequency changer (AC/AC) or an inverter (DC/AC).

FIG. 1, is a block diagram illustrating some of the key components of a typical DC/DC converter, which converts an input DC voltage $V_{in}$ to a desired DC output voltage $V_{out}$. The primary side of the power supply 100 comprises a switching device in the form of a power transistor 110, whose switching generates an AC voltage from the input voltage $V_{in}$. The AC output of the transistor 110 drives a primary winding of the power supply's transformer 120, causing an AC current to be induced in the transformer's secondary winding. The AC voltage thus generated across the transformer's secondary winding is filtered by a filter 130, which typically comprises an inductor coupled to a capacitor in a low-pass filter configuration (not shown).

The power supply 100 further comprises a feedback circuit in the form of a voltage regulator 140, which is arranged to monitor the power supply's output voltage $V_{out}$ and generate a feedback signal on the basis of $V_{out}$ and a reference voltage, $V_{ref}$. The feedback signal can be regarded as an error signal indicative of the difference between the power supply's output voltage (and the target voltage or set-point, $V_{ref}$. In particular, the voltage regulator 140 is of an integral wind-up type in the present example, such that the feedback signal increases as a (long-term) integrated voltage error, which is accumulated by the voltage regulator, increases. Although information may be encoded in the feedback signal by frequency- or phase-modulating a carrier wave, it is preferable for information to be encoded in the feedback signal simply via the amplitude of a DC voltage. The voltage regulator can be provided in the form of a PID, PI or I-controller, for example.

The feedback signal is communicated from the voltage regulator 140 via an isolation barrier 145 (e.g. an optical coupler) to the power supply's switching controller, which is provided in the form of a pulse width modulator (PWM) 150. As illustrated in FIG. 1, the PWM 150 on the primary side is configured to generate and apply voltage pulses 155 of an appropriate frequency (e.g. 100 kHz) to the gate of the power transistor 110. Moreover, the PWM 150 is arranged to vary the output voltage $V_{out}$ by adjusting the duty cycle D of the pulses (defined by $D=T_{ON}/T_s$, where $T_{ON}$ is the duration of a pulse and $T_s$ is the switch period) based on the received feedback signal. Alternatively, instead of the PWM controller 150, a frequency-modulating controller (not shown) can be used, which modulates the frequency at which pulses of a fixed duration are generated.

The power supply 100 also includes an output current monitor 160 which is arranged to measure the power supply's input current and communicate the results of its current measurement to a Module Management Controller (MMC) 170 of the power supply, which is also provided on the primary side of the power supply. The MMC 170 is preferably further configured to receive other parameters relating to the operation of the power supply, such as information concerning the duty cycle set in the PWM 150, the temperature in the transformer 120 (and/or the temperature at another hot-spot in the power supply), system status information for fault monitoring and diagnostics etc. These parameters may be used by the MMC 170, for example to implement safety features such as protective cut-offs which ensure that critical parameters such as the component temperatures do not exceed pre-determined thresholds. The MMC 170 may forward some of the received information to a higher-level system which may be located off the board(s) on which the converter 100 is formed.

In the present example the MMC 170 serves to configure, monitor and control operational parameters and settings of the converter 100. For example, the MMC 170 may be configured to control a start-up procedure performed by the power supply, during which the converter gradually transitions from a non-operational state (in which the power supply transfers no power from its input to its output) to operating in a first or a second operational mode. These modes will now be described.

During operation of the converter, the current monitor 160 generates a signal indicative of the input current level and processes the monitored signal by filtering it. The filtered signal is then communicated to the MMC 170. Alternatively, the aforementioned signal processing may be performed in the MMC itself. In either case, the MMC 170 then determines whether the received signal indicates that the power supply's input current has exceeded a threshold value.

During normal operation, where the power supply's input current is below the threshold and thus within a safe operating range (such that the power supply can operate for extended periods of time without sustaining damage), the feedback control loop comprising the voltage regulator 140 and the PWM 150 maintains the output voltage $V_{out}$ at a predetermined level (for example, the CPU core voltage of a CPU that the converter powers) by making small corrections to the duty cycle of the transistor switching. During this first mode of operation, the feedback signal generated by the voltage regulator 140 will generally be very small.

If, on the other hand, the MMC 170 determines that the power supply's input current has exceeded the threshold value, the MMC generates an excess current control signal for controlling the PWM 150 to progressively decrease the duty cycle in order to reduce the output voltage $V_{out}$, and thus bring the input current to within the safe range. That is, when the output current exceeds the Threshold, the PWM 150 operates in a second operational mode (also referred to herein as the "continuous current protection" (CCP) mode) to reduce the output voltage $V_{out}$, and therefore the input current, to below the threshold, on the basis of the excess current control signal generated by the MMC 170. Thus, since CCP has priority over voltage regulation, in the CCP mode the PWM 150 allows the excess current control signal from the MMC 170 to override the feedback signal from the voltage regulator 140, allowing the PWM to implement a (often linear) current limiting function. In this way, the converter will attempt to limit its output power.

The output current monitor 160 and the MMC 170 together provide the function of a current limiting circuit, which determines the input current and generates an excess current control signal when the input current exceeds a current threshold. During operation in the CCP mode, the excess current control signal will depend on the size of the deviation of the output current from the threshold but will generally be very small. In practice, operation in the CCP mode provides something between constant current and constant power control, depending on whether the converter is a current mode converter (often used in a Flyback configuration) or voltage mode converter (often used in half-bridge or full-bridge configurations).

The over-current protection (OCP) provided by the above-described power supply operating in the CCP mode is effective where the excursions of the input current above the threshold are small and short-lived. The power supply will be able to recover smoothly from such over-current situations using CCP.

However, operation in the CCP mode gives rise to a long current tail, which means that the power supply could, under some load conditions, operate at a high enough load level and for a sufficient period of time to overheat or sustain damage. Robustness against such overheating or damage may be improved by increasing the power supply's input current headroom, although at the cost of reducing its power rating. Moreover, a more extreme over-current situation could occur during operation, such as a crowbar short-circuit, in which CCP would be ineffective.

In view of these shortcomings of CCP, power supply designers have resorted to other, more aggressive protective measures instead of CCP, such as latching the power supply's output when the input current exceeds a threshold, thereby losing the advantages of CCP. In other words, in this scheme the converter is stopped when an over-current situation is detected, and then needs to be reset externally by the user. A related approach employs the so-called "hiccup" functionality, whereby the converter itself attempts to restart after being stopped, rather than having to be restarted externally.

Although these types of OCP can respond very quickly to protect the converter against rapid load changes (e.g. a crowbar short-circuit), they cannot distinguish between such rapid load changes and more benign ones, which could be handled without shutting down the converter, for example by using CCP. Besides the risk of false triggering, the output-latching and hiccup approaches require a guard band to be provided up to the trigger point, which leads to the further risk of the converter sustaining damage by operating within the guard band for a lengthy period of time.

In these alternative approached to OCP, the input current needs to be monitored by the current monitor 160 and a decision reached on whether a shut-down or a restart of the converter is justified. However, the input current monitored by the current monitor 160 in the converter of FIG. 1 is small and noisy, and would therefore need to be filtered and amplified before it can be analysed. However, providing the current monitor 160 or the MMC 170 with the required additional filtering and amplification means significantly increases the component count and the fabrication cost of the converter, and since these additional components will inevitably dissipate power, also lowers the converter's efficiency.

Accordingly, there has been a need to develop an efficient SMPS of a simple construction having an OCP mechanism that retains the advantages of conventional CCP whilst providing second-level protection against current level increases that cannot be handled safely by CCP.

SUMMARY OF THE INVENTION

In order to overcome the shortcomings of conventional OCP in switched mode power supplies as described above, the inventors have conceived a switched mode power supply according to the present invention, which comprises a switching device, a feedback circuit, a current limiting circuit, a controller, and an overload detector.

The switched mode power supply is operable to convert an input voltage to an output voltage by switching the switching device. The feedback circuit is operable to generate a feedback signal based on at least one of the output voltage and an output current of the switched mode power supply. The current limiting circuit is operable to determine a current in the switched mode power supply and generate an excess current control signal when the current exceeds a current threshold.

The controller is arranged to receive the feedback signal and the excess current control signal, and is operable to control the switching device in a first operational mode when the current determined by the current limiting circuit is below the current threshold, to regulate one of the output voltage and the output current based on the feedback signal. The controller is also operable to control the switching device in a second operational mode when the current determined by the current limiting circuit exceeds the current threshold, to reduce the current in the switched mode power supply on the basis of the excess current control signal.

The overload detector is arranged to receive the feedback signal and is operable to: determine whether the feedback signal is outside a predetermined range; if the feedback signal is outside the predetermined range, determine that the switched mode power supply is in an overload state; and when an overload state is determined, perform control to place the switched mode power supply in a non-operational state.

The present invention further provides a method of controlling a switched mode power supply. The switched mode power supply comprises: a switching device, the switched mode power supply being operable to convert an input voltage to an output voltage by switching the switching device; a feedback circuit operable to generate a feedback signal based on at least one of the output voltage and an output current of the switched mode power supply; a current limiting circuit operable to determine a current in the switched mode power supply and generate an excess current control signal when the current exceeds a current threshold; and a controller, the controller being arranged to receive the feedback signal and the excess current control signal, and operable to control the switching device: in a first operational mode when the current detected by the current limiting circuit is below the current threshold, to regulate one of the output voltage and the output current based on the feedback signal; and in a second operational mode when the current by the current limiting circuit exceeds the current threshold, to reduce the current in the switched mode power supply on the basis of the excess current control signal. The method comprises: receiving the feedback signal; determining whether the feedback signal is outside a predetermined range; if the feedback signal is outside the predetermined range, determining that the switched mode power supply is in an overload state; and when an overload state is determined, performing control to place the switched mode power supply in a non-operational state.

As will be appreciated from the above summary and the following detailed description, an SMPS of an embodiment of the present invention takes advantage of a departure of the feedback signal from a predetermined range of values, which may occur whilst the SMPS is operating in the second, current-limiting operational mode. This departure originates from the excess current control signal being used by the controller instead of the feedback signal in the second operational mode. In other words, in the second operational mode, the current in the SMPS is reduced on the basis of the excess current control signal, causing the feedback circuit to respond by increasing the feedback signal in its attempt to regulate the output current and/or voltage. In practical applications, the feedback signal is found to be large enough to be easily detected and processed (e.g. subjected to A/D conversion) whilst the SMPS is operating in the second operational mode, without the need to employ filtering and amplification for these purposes.

Thus, the overload detector of the embodiments described herein is able to detect in an elegant way with minimal additional components that the SMPS is in an overload state from which it cannot safely recover to the first operational mode by operating in the second operational mode, and in these circumstances perform control to place the SMPS in a non-operational state. This improved protection allows the power rating of the power supply to be increased as it can be driven closer to its limit without the risk of a breakdown. The price per kilowatt ratio is thus improved.

BRIEF DESCRIPTION OF THE DRAWINGS

Embodiments of the invention will now be explained by way of example only, in detail, with reference to the accompanying figures, in which.

DETAILED DESCRIPTION OF EMBODIMENTS

Embodiments of the invention comprising a switched mode DC/DC power supply will now be described. However, the present invention is applicable to other types of switched mode power supply.

Figure 1:
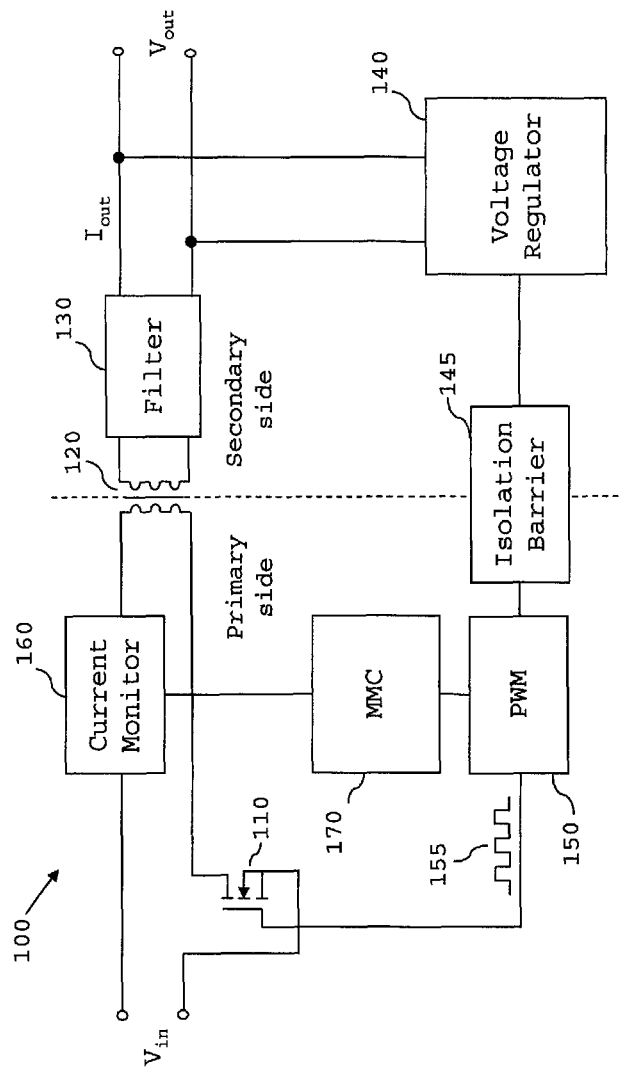
FIG. 1 is a block diagram illustrating features of a conventional switched mode DC/DC power supply that are helpful for understanding the present invention.
Figure 2:
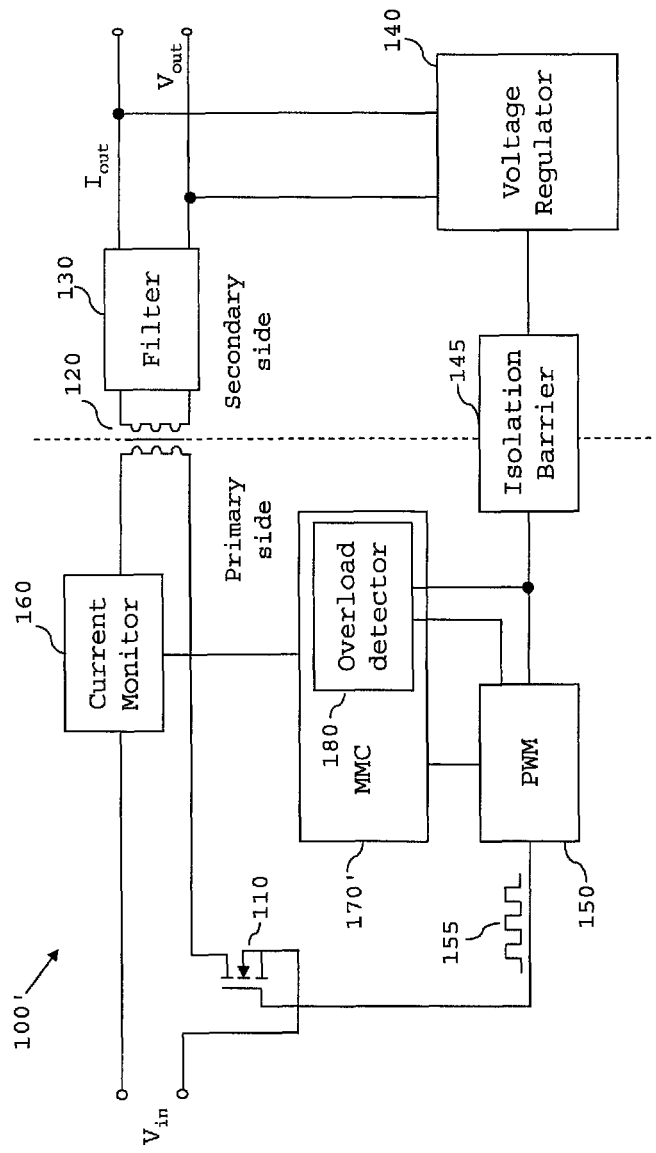
FIG. 2 is a block diagram illustrating a switched mode DC/DC power supply according to an embodiment of the present invention.

FIG. 2 is a schematic of a switched mode DC/DC power supply 100' according to an embodiment of the present invention. In FIGS. 1 and 2, like numerals are used to label like components of the power supplies. The foregoing description of these components and associated modifications and alternatives is therefore applicable to the present embodiment but will not be repeated here, for sake of conciseness. Furthermore, since all of these common components can readily be implemented in hardware in a form that meets the requirements of a particular SMPS by those skilled in the art, a further detailed description of these common components and other related design criteria is unnecessary. However, the differences between the background example of FIG. 1 and the present embodiment will now be described in detail.

As shown in FIG. 2, the DC/DC converter 100' of the present embodiment includes, in addition to the components which have already been described with reference to FIG. 1, a modified MMC 170' that has all the functions of the conventional MMC 170 of FIG. 1 and further comprises an overload detector 180 for detecting an overload state of the converter.

Figure 3:
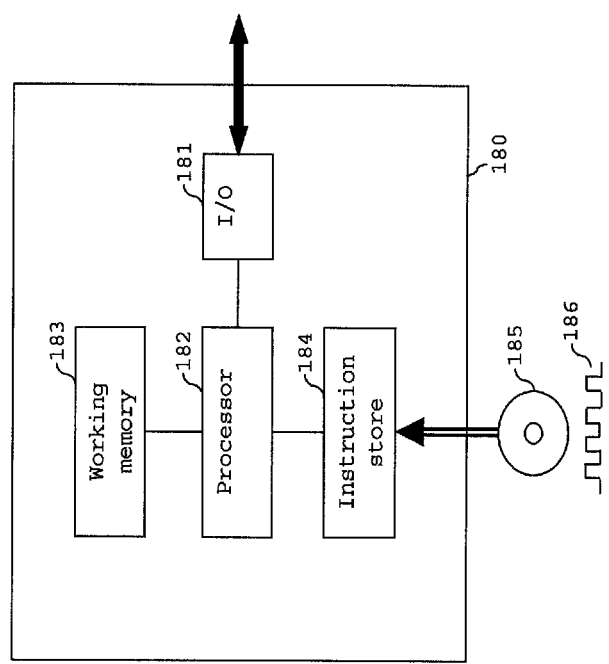
FIG. 3 shows details of the overload detector 180 shown in FIG. 2.

FIG. 3 shows details of the hardware used to implement the overload detector 180. The overload detector functions as a supervising module which works side by side with a CCP module to implement a hiccup or latching function when necessary, so that the converter implements both CCP and also the hiccup or latching functions. It is noted that the hardware illustrated in FIG. 3 provides the functions of both the conventional MMC 170 and the overload detector 180. However, the following description will focus on the function of the hardware as an overload detector.

In the present embodiment, the overload detector 180 comprises an input/output (I/O) section 181 arranged to receive the feedback signal from the integral-type voltage regulator 140, perform an A/D conversion of the received signal, sample the resulting digitised signal, and communicate the samples to the processor 182. The I/O section 181 is further arranged to communicate with the PWM 150 and send instructions instructing the PWM to stop its control of the switching device 110 and leave the switching device switched OFF, thereby placing the converter in a non-operational state. It will be appreciated that a non-operational state could be effected in other ways, for example by switching OFF all of the components of the power supply or a component such as the PWM 150. Similarly, such a non-operational state could be effected by placing some or all of the components in a stand-by state, in which their operation is put on hold temporarily.

The overload detector 180 further comprises a working memory 183 for storing operational status information including an indication of whether the converter 100' is executing a start-up procedure, and an indication of a temperature measured in the converter (these being received or generated and then stored by the hardware 180 while functioning as the MMC), as well as other data and computation results obtained during operation of the overload detector. In particular, the working memory 183 is used to store sample values of the feedback signal, one or more values defining an end-point of a predetermined range that is used by the overload detector to evaluate the sample values, the count on a counter, as well as an associated initial count, a reference count, a threshold count and values for changing the count, whose use will be described in the following.

The overload detector 180 further comprises an instruction store 184 storing computer-readable instructions which, when executed by the processor 182 cause the processor to perform the processing operations hereinafter described to detect an overload state. The instruction store 184 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 184 may comprise a volatile memory (e.g. DRAM or SRAM), and the computer-readable instructions can be input thereto from a computer program product, such as a computer-readable storage medium 185 (e.g. an optical disc such as a CD-ROM, DVD-ROM etc.) or a computer-readable signal 186 carrying the computer-readable instructions.

Figure 4:
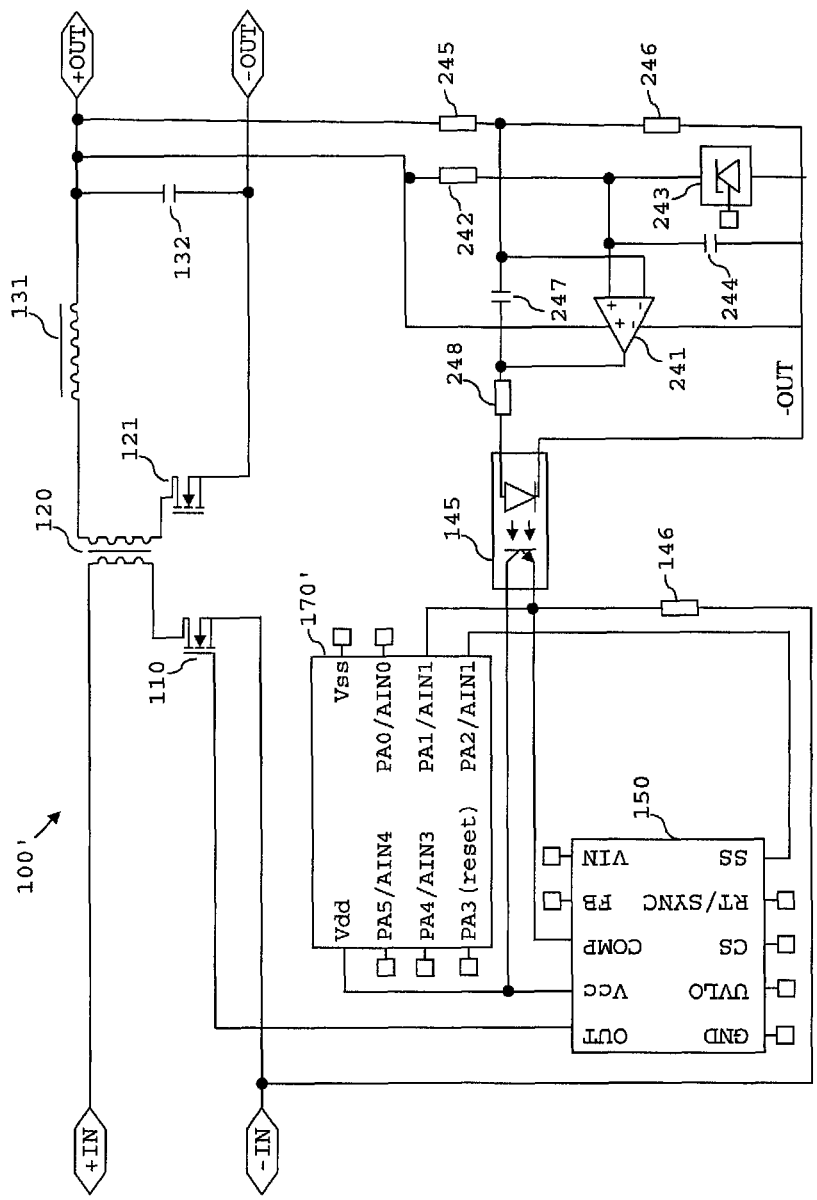
FIG. 4 is a circuit diagram showing details of some of the blocks shown in FIG. 2.

FIG. 4 is a circuit diagram of a DC/DC converter 100' showing further details of the converter 100' and the blocks shown in FIG. 2. For clarity, the current monitor 160 is not shown in FIG. 4.

The converter 100' shown in FIG. 4 includes the power transistor 110 on the primary side of a transformer 120, and another power transistor 121 on the secondary side. The output filter (130 in FIG. 2) comprises an inductor 131 and a capacitor 132, which are connected to the secondary winding of the transformer 120 as shown.

The voltage regulator (140 in FIG. 2) provided on the secondary side of the converter 100' comprises an operational amplifier 241 which is powered by the output of the converter 100'. The non-inverting (reference voltage) input terminal of the operational amplifier 241 is coupled to the "−OUT" reference via a capacitor 244 and a Zener diode 243 connected in parallel, and also to the "+OUT" output terminal of the converter via a resistor 242. The inverting input terminal of the operational amplifier 241 is connected to a potential divider provided by resistors 245 and 246, which are connected between the +OUT output terminal of the converter and the −OUT reference. The operational amplifier is configured as an inverting integrator by the provision of a capacitor 247 between the inverting input and the amplifier's output terminal. The output of the operational amplifier 241 provides an error voltage, which is normally 1.5 to 2 V but can reach 5 V while the PWM is operating in the second, output current-limiting mode.

The output of the amplifier is connected to an optical coupler 145 via a resistor 248, allowing the feedback signal to be communicated to the primary side of the converter 100'.

On the primary side, the photo-transistor of the optical coupler 145 and a resistor 146 form a potential divider which is connected between the "−IN" reference and a supply voltage that is applied to both the "Vcc" pin of the PWM 150 and the "Vdd" pin of the MMC 170'. The output of the potential divider is connected to the "COMP" pin of the PWM 150 as well as to the "PA1/AIN1" pin of the MMC 170'. The impedance of the optical coupler's photo-transistor, and thus the voltage on the COMP and PA1/AIN1 pins, will vary depending on the size of the error voltage output by the operational amplifier 241. The voltage on the COMP pin (hereinafter referred to as the COMP voltage) that provides the feedback signal on the secondary side will usually stay at approximately 40 to 50% of the level on the Vcc pin during normal operation. However, when the voltage output by the operational amplifier reaches its maximum value, the COMP voltage will be almost equal to the supply voltage Vcc.

Figure 5:
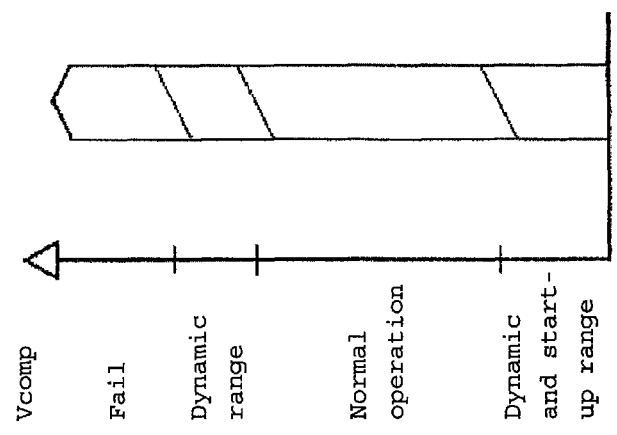
FIG. 5 illustrates the ranges of values in which the voltage on the COMP pin of the PWM 250 shown in FIG. 4 may fall.

The range of values which the COMP voltage may take can be considered to fall into one of a number of bands, as illustrated in FIG. 5. The COMP voltage is normally inside a voltage window (labelled "Normal operation" in FIG. 5) while the converter is operating in the first, output-regulation operational mode. Departures of the COMP voltage to values above or below the window, within the bands labelled "Dynamic range" and "Dynamic and start up range", indicate that there might be a dynamic issue with transients, or that the converter is operating in a short-term operational mode during which the converter's output varies rapidly, such as during start-up.

However, when an over-current situation develops and the input current is limited by CCP, the voltage regulator implementing the output voltage control loop will detect that output is low (because the duty cycle has been limited by CCP). The voltage regulator 140 will then ask for more duty cycle by continuously increasing the error signal, until either the demand is fulfilled or it reaches a technical maximum. Thus, if the COMP voltage reaches the "Fail" region shown in FIG. 5, this suggests that the PWM 150 is unable to deliver the relatively high duty cycle that is required by the voltage regulator 140 in its frustrated attempt to regulate the converter's output whilst the PWM 150 is operating in the second, input current-limiting mode. It is therefore likely that an excursion of the COMP voltage into the "Fail" region is caused by the duty cycle being limited by CCP, such that the voltage regulator's target output voltage cannot be achieved. Most PWM circuits are designed in such a way that the last 20% of the COMP voltage range to Vcc or ground will never be used in the first operational mode, except during dynamic situations.

In the circuit of FIG. 4, the overload detector 180 in the MMC 170' is arranged to receive the feedback signal that is input to the MMC 170' via the PA1/AIN1 pin, and is also configured to output a control signal to the PWM 150 via the PA2/AIN1 pin of the MMC 170', for placing the PWM 150 in a non-operative state. The PA2/AIN1 pin of the MMC 170' is connected to the "SS" pin of the PWM 150.

The MMC 170' is arranged to receive and store in the working memory 183 an indication of a measured temperature in the converter 100' from an external temperature sensor (e.g. provided within the transformer or another region of interest in the converter 100'). In an alternative example, the temperature sensor may be formed integrally with the circuit board of the MMC.

Three examples of the processing and control operations performed by the overload detector 180 will now be described with reference to FIGS. 6 to 8.

EXAMPLE 1

Figure 6:
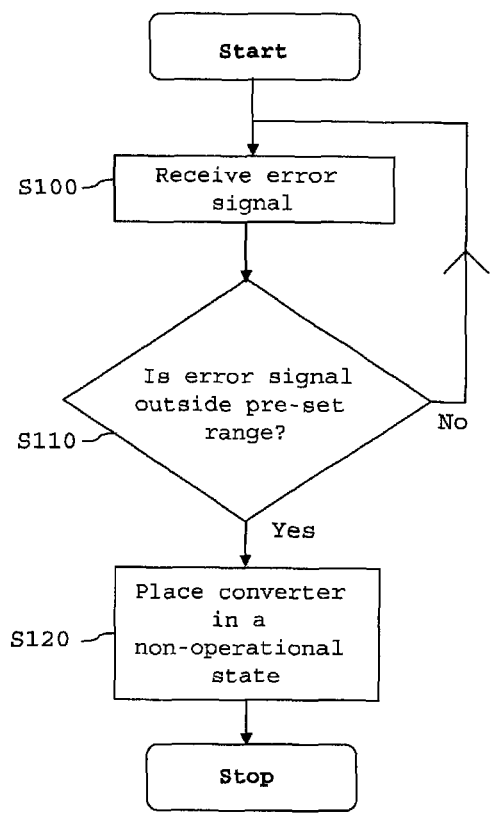
FIGS. 6 to 8 are flow diagrams each illustrating a method of controlling a switched mode power supply according to an embodiment of the present invention.

Referring first to the scheme illustrated in FIG. 6, in step S100, the overload detector 180 receives the feedback signal (error signal) via its I/O section 181 from the voltage regulator.

Then, in step S110, the overload detector 180 determines whether the feedback signal is outside a predetermined range, particularly by determining whether the COMP voltage exceeds a threshold such that it lies in the aforementioned "Fail" region shown in FIG. 5. If the feedback signal is outside the ranges encountered during normal operation (with allowance being made for transients etc. that may bring the COMP voltage within the "Dynamic" range bands), the overload detector 180 determines that the converter is in an overload state. However, if the feedback signal is not within the "Fail" region, the process loops back to step S100.

Once the overload detector has detected that the converter 100' is an overload state in step S110, the process proceeds to step S120, in which the overload detector 180 performs control to place the converter 100' in a non-operational state, which in this embodiment is performed by sending a control signal to the PWM's "SS" pin instructing the PWM to cease sending voltage pulses to the transistor 210 and thus leave the transistor switched OFF. The MMC 170' may, after an appropriate delay, subsequently attempt to restart the IMPS.

EXAMPLE 2

The monitoring of the COMP signal by the overload detector 180 and its operation according to the above scheme allows the overload detector to simply and reliably detect an overload state of the DC/DC converter. Furthermore, since the COMP signal has already been subjected to filtering and amplification by the feedback circuit, the signal can be processed by the detector without the detector needing to filter or amplify the signal.

However, as noted above, short-term excursions of the feedback signal into the "Fail" region can occur if the SMPS 100' encounters dynamic situations during its operation. For example, it may be that the power supply is charging a large capacitor, or that the speed of a fan being powered by the SMPS 100' suddenly changes. If the power supply is to operate in an environment where such situations are expected to occur, it might be preferable to adapt the OCP mechanism of Example 1 to have a degree of tolerance to such dynamic situations. The OCP scheme of Example 2 provides such functionality, as will now be explained.

Figure 7:
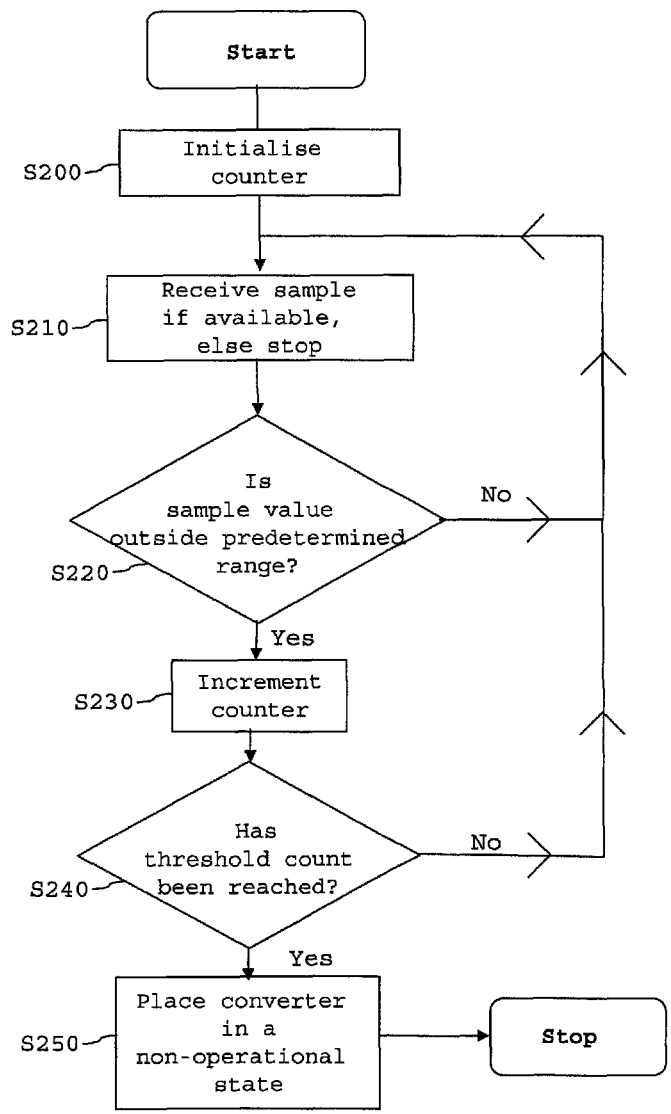

Referring to FIG. 7, in step S200, the overload detector 180 initialises a counter, which may be an appropriately sized hardware or software buffer or simply a variable whose value is recorded in the detector's working memory 183. In the present example, the counter is set to an initial count of zero and is arranged to count upwards. Alternatively, the counter may be initialised to an appropriate value larger then zero and arranged to count down towards zero.

In step S210, the overload detector 180 obtains the first of a plurality of sample values of the feedback signal from the voltage regulator 140 using the I/O section 181. In the present example, the I/O section 181 performs A/D conversion of the received feedback signal and samples the resulting digital signal (e.g. at 1 kHz) to obtain a sample value. The sample value thus obtained is then provided to the processor 182 and processed by the processor in step S220, before the next sample is obtained. The I/O section 181 may alternatively obtain a set of samples and then feed the sample values to the processor 182.

In step S220, the overload detector 180 determines, for each sample value obtained, whether the sample value falls within the "Fail" region and, if so, changes the count on the counter in step S230. In the present example, the counter is incremented by 1 in step S230. If the sample value is not determined to be within the "Fail" region, the process loops back to step S210, in which the next sample value is obtained.

After completion of step S230, the process proceeds to step S240, where the overload detector 180 determines whether the count has reached a threshold count. If it is determined that the threshold count has not been reached, the process loops back to step S210. However, if the count has reached the threshold count, the process proceeds to step S250, in which the overload detector 180 performs control to place the converter 100' in a non-operational state, which in this embodiment is performed by sending a control signal to the PWM's "SS" pin instructing the PWM 150 to cease sending voltage pulses to the transistor 210 and thus leave the transistor switched OFF. The MMC 170' may, after an appropriate delay, subsequently attempt to restart the SMPS.

The process of Example 2 stops once the power supply has been shut down in step S250. Alternatively, if the last sample of the plurality of samples has been processed without the threshold count being reached, the process stops at step S210. In either case, the counter is then reset in preparation for the processing of a following set of sample values.

EXAMPLE 3

A further OCP scheme will now be described with reference to FIG. 8. The operation of the overload detector 180 in accordance with this scheme reduces the risk of the detector false-triggering and unnecessarily shutting down the power supply 100' during the power supply's start-up phase. In addition, the OCP mechanism of the present example takes into account the temperature of the power supply, which can affect the power supply's ability to safely handle over-current situations. In particular, the OCP scheme described below allows the overload detector 180 to implement protective measures more quickly at high temperatures, at which the power supply is more prone to damage when overloaded.

Similar to Example 2, the OCP scheme of the present example counts the number of COMP voltage samples that represent a COMP voltage in the "Fail" region, by increasing (or, as the case may be, decreasing) the count on a counter. When the counter is judged to have accumulated too many Fail data (i.e. records of a Fail condition having been established by the overload detector) over a given period of time, a decision is made by the overload detector 180 to place the converter 100 in a non-operational state. However, in the present example, the detection of a Fail condition causes the counter to be changed by a first step size (e.g. 5), while the count is adjusted (up or down) towards a reference count value by a second, smaller step size (e.g. 1) in each iteration of the process. In addition, the first step size may be set in dependence on a measured temperature of the power supply, thereby making it possible to reduce the number of Fail detections required to cause the count to reach the threshold count at high temperatures.

Figure 8:
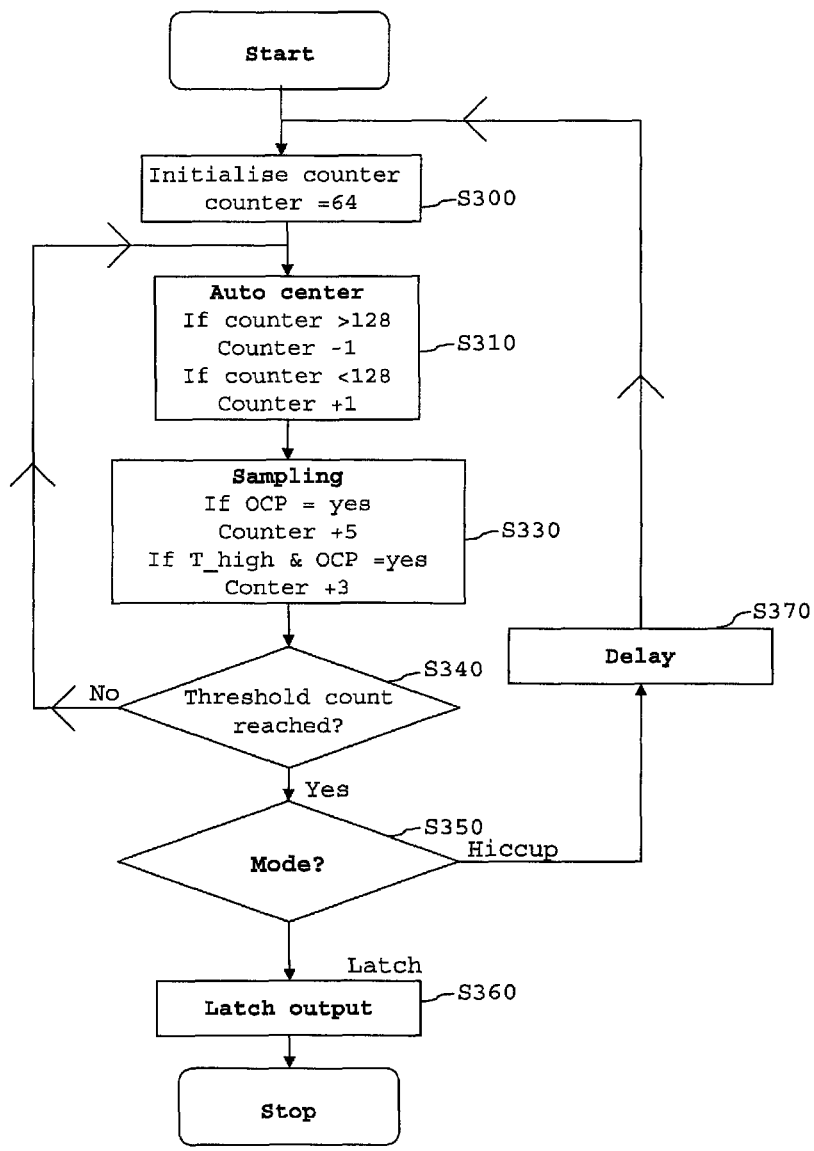

FIG. 8 is a flow diagram illustrating a set of processes S310-S340 that are performed iteratively by the overload detector 180. This example assumes that the counter of the overload detector 180 is provided as an 8-bit register and that the set of processes is repeated every millisecond, but this is not limiting.

The process begins with step S300, in which the count on the counter is set to an initial count, which preferably differs from the reference count. In the present example, the counter is set to a slightly lower value than the mid-point of the register's range of values. Specifically, the initial count is set to 64. The purpose of this is to prevent the transition of the power supply to the non-operative state whilst the power supply is starting up, to allow for the charging of large capacitors etc.

The process then proceeds to step S310, where the "Auto-center" routine is performed. This routine attempts to center the counter value at the reference value of 128. When normal operation has been maintained for a while, the counter will have the value 128. This counter is thus an averaging buffer. After a maximum of 127 cycles, all sensed over-current conditions will be erased completely if no new ones have been detected during this time. This kind of memory makes the protection more aggressive when the Fail condition is detected repeatedly over a relatively short period of time.

More specifically, in step S310, overload detector 180 assigns a first value (which is set to 1 in this embodiment, but may comprise other values) for incrementing the count if the count from a previous iteration is smaller than the reference count. Alternatively, if the count from the previous iteration is larger than the reference count of 128, the overload detector 180 assigns the first value for decrementing the count.

In step S330, the overload detector 180 obtains a sample value of the feedback signal and determines whether the obtained sample value places the OCP voltage within the Fail region. If so, the overload detector 180 assigns a second value (which is set to 5 in this embodiment, but may comprise other values) for changing the count.

Furthermore, the overload detector 180 preferably receives a value indicative of a temperature of the converter. Where the COMP voltage sample value indicates that the COMP voltage is outside the predetermined region (this comprising the voltage region below the Fail region in FIG. 5), the overload detector 180 assigns a further value for changing the count, this further value being set in dependence on the temperature. In the present example, the overload detector sets the further value to 3 (although other values could be set) if it determines that the measured temperature is higher than a threshold temperature, and otherwise sets this value to zero. Alternatively, the overload detector may set the further value to one of a set of integer values, each associated with a different range of temperatures.

The overload detector 180 then changes the count on the counter by the assigned values. Thus, if the sample indicates that the COMP voltage is outside the predetermined range and that the converter's temperature is below the threshold temperature, the counter is increased by +5. However, if the sample indicates that the COMP voltage is outside the predetermined range and the converter's temperature is above the threshold temperature, the counter is increased by +8. It is noted that the counter may be changed more than once in each iteration following the assignment of each of the values for changing the counter, or it may be changed only once in each iteration, in accordance with the assigned values.

In step S340, the overload detector 180 determines whether the count has reached the threshold count (set to 246 in this embodiment, although other values could be set), which would cause the counter to overflow. If the count is above 128, the count can increase at a rate of 4 per cycle (it is noted that the Auto-center routine will decrement the count by 1 in each cycle). Thus, if the Fail condition is being detected for each sample, the counter will overflow after 33 iterations, which will take 33 ms.

However, if the power supply is running hot such that its measured temperature is above the threshold temperature, the count will be incremented as a maximum rate of 7 (5+3−1) per cycle, with the result that the counter will overflow after just 19 iterations, or 19 ms.

It is also noted that the power supply is starting up and the process of FIG. 8 is being executed from Start, the initialisation of the counter to a count of 64 will delay the overflow until at least 48 ms after the process starts at temperatures below the threshold temperature (or at least 28 ms at higher temperatures).

If in step S340 it is determined that the threshold count has not been reached, the process loops back to step S310. On the other hand, if the threshold count has been reached, the process proceeds to step S330, in which the overload detector determines which of the "latch" and "hiccup" modes to implement. The detector may select the appropriate mode by checking a flag provided for this purpose in the working memory 183 or the instruction store 184. The status of the flag may be changed by user programming. Thus, if the detector is configured to implement a latch function, the process proceeds to step S360, in which the overload detector 180 latches the converter's output by sending a control signal to the PWM's SS pin instructing the PWM to cease sending voltage pulses to the transistor 210 and thus leave the transistor switched OFF. If the detector is configured to implement a hiccup function, the process proceeds to step S370, in which the detector similarly performs control to place the converter in a non-operational state, and then executes a delay before initiating start-up of the converter. After the delay has been executed in step 370, the process loops back to step S300.

It will be appreciated from the above that if glitches occur, they will not cause the converter to enter a non-operational state if the average duty cycle of Fail condition detections is less than 25%, which can be considered to be acceptable overload. At temperatures above the threshold temperature, an acceptable average duty cycle of Fail condition detections may be 17%.

Of course, it will also be appreciated that the numbers, times and other parameters mentioned above are given by way of example only, and will need to be set according to the requirements of the particular DC/DC converter under consideration and the load, that it is intended to supply.

[Modifications and Variations]

Many modifications and variations can be made to the embodiment described above.

For example, although the above embodiments are directed to voltage-controlled converters having an output voltage regulator, the principles described herein are also applicable to current-controlled converters.

Furthermore, in alternative embodiments of the present invention, the current monitor 160 (forming part of the current limiting circuit) is provided on the secondary side of the converter. The current monitor 160 may be operable to determine the output current of the switched mode power supply and communicate the results of its current determination to the MMC 170, which generates an excess current control signal when the output current exceeds the current threshold. In this case, the current monitor 160 may be connected in between the transformer 120 and the filter 130, or may alternatively be connected to the output of the filter 130 in FIG. 2

In the embodiments described above, the overload detector 180 comprises a programmable processing apparatus having a processor 182 which performs described operations in accordance with software instructions stored in instructions store 184. However, it will be appreciated that the overload detector may be configured otherwise. For example, overload detector 180 may comprise non-programmable hardware (e.g. an ASIC) dedicated to performing the described functions. Similarly, the MMC may comprise digital circuits combined with active/passive components. In any case, the hardware implementing the functions of the overload detector may also be configured to perform the functions of one or more of the other components of the converter such as the MMC 170', as noted above. For example, a single integrated circuit could perform the functions of the MMC 170', PWM 150, voltage regulator 140 and the overload detector. Alternatively, the overload detector 180 may be provided as a stand-alone device that is arranged to communicate with the MMC 170', PWM 150 and the voltage regulator 140.

In the flowcharts of FIGS. 6 to 8, the processing operations are performed in a particular order. However, the order of many of the operations can be changed. For example, the order of steps S310 and S330 in FIG. 8 may be reversed. Similarly, the assignments of the values of changing the count on the counter in step S330 and the associated change(s) in the count on the counter may be performed in any suitable or desirable order.

Further in connection with Example 3, it is noted that the counter may be set to the reference value in step S300, and the problem of transients during start-up dealt with by the overload detector 10 determining in step S330 whether the converter 100' is starting up. If the converter is determined to be starting up and the sample value is determined to be outside the predetermined range, overload detector 180 assigns a third value for changing the count, the third value being smaller than and of opposite sign to the second value of 5. For example, the third value could be set to −2. In this way, the counter would take longer to overflow while the power supply is in the process of starting up.

Although an embodiment in the form of a DC/DC power supply has been described, it will be appreciated that the techniques of the present invention are applicable to other types of switched mode power supply.

The invention claimed is:

1. A switched mode power supply, comprising:
a switching device, the switched mode power supply being operable to convert an input voltage to an output voltage by switching the switching device;
a voltage regulator, being one of a PID controller, PI controller, and an I controller, operable to generate a feedback signal based on at least one of the output voltage and an output current of the switched mode power supply;
a current limiting circuit operable to determine a current in the switched mode power supply and generate an excess current control signal when the current exceeds a current threshold;
a controller arranged to receive the feedback signal and the excess current control signal, and operable to control the switching device:
in a first operational mode when the current determined by the current limiting circuit is below the current threshold, to regulate one of the output voltage and the output current based on the feedback signal; and
in a second operational mode when the current determined by the current limiting circuit exceeds the current threshold, to reduce the current in the switched mode power supply on a basis of the excess current control signal;
an overload detector arranged to receive the feedback signal and operable to:
determine whether the feedback signal is outside a predetermined range;
if the feedback signal is outside the predetermined range, determine that the switched mode power supply is in an overload state; and
when the overload state is determined, perform control to place the switched mode power supply in a non-operational state.

2. The switched mode power supply according to claim 1, wherein the overload detector is operable to:
obtain a plurality of sample values of the feedback signal;
determine, for each sample value of the plurality of sample values, whether the sample value is outside the predetermined range and, if the sample value is outside the predetermined range, change a count on a counter; and
determine whether the count has reached a threshold count, and if the count has reached the threshold count, perform control to place the switched mode power supply in the non-operational state.

3. The switched mode power supply according to claim 2, wherein the overload detector is arranged to iteratively perform a set of processes, comprising:
assigning a first value for incrementing the count if the count from a previous iteration is smaller than a reference count, and assigning the first value for decrementing the count if the count from the previous iteration is larger than the reference count;
obtaining a sample value of the feedback signal;
determining whether the sample value is outside the predetermined range and, if the sample value is outside the predetermined range, assigning a second value for changing the count, the second value being greater than the first value;
changing the count on the counter by the first value or the second value; and
determining whether the count has reached the threshold count,
and wherein the overload detector is arranged to stop iteratively performing the set of processes and perform control to place the switched mode power supply in the non-operational state, if the count has reached the threshold count.

4. The switched mode power supply according to claim 3, wherein the overload detector is arranged to iteratively perform the set of processes, which further comprise:
determining whether the switched mode power supply is starting up; and
if the switched mode power supply is determined to be starting up and the sample value is determined to be outside the predetermined range, assigning a third value for changing the count, the third value being smaller than and of opposite sign to the second value.

5. The switched mode power supply according to claim 3, wherein the overload detector is arranged to iteratively perform the set of processes, which further comprise:
obtaining a sample value indicative of a temperature of the switched mode power supply; and
if the sample value is determined to be outside the predetermined range, assigning a fourth value for changing the count.

6. The switched mode power supply according to claim 3, wherein, the overload detector is arranged to set the count on the counter to an initial count prior to iteratively performing the set of processes, the initial count being different from the reference count.

7. A method of controlling a switched mode power supply, the method comprising:
receiving a feedback signal generated by a voltage regulator of the switched mode power supply, the voltage regulator being one of a PID controller, PI controller, and an I controller, operable to generate the feedback signal based on at least one of an output voltage and an output current of the switched mode power supply;
determining whether the feedback signal is outside a predetermined range;
if the feedback signal is outside the predetermined range, determining that the switched mode power supply is in an overload state; and
when the overload state is determined, performing control to place the switched mode power supply in a non-operational state,
wherein the switched mode power supply includes:
a switching device, the switched mode power supply being operable to convert an input voltage to the output voltage by switching the switching device;
a current limiting circuit operable to determine a current in the switched mode power supply and generate an excess current control signal when the current exceeds a current threshold;
a controller arranged to receive the feedback signal and the excess current control signal, and operable to control the switching device:
in a first operational mode when the current determined by the current limiting circuit is below the current threshold, to regulate one of the output voltage and the output current based on the feedback signal; and
in a second operational mode when the current determined by the current limiting circuit exceeds the current threshold, to reduce the current in the switched mode power supply on a basis of the excess current control signal.

8. The method according to claim 7, wherein to determine whether the feedback signal is outside a predetermined range:

a plurality of sample values of the feedback signal are obtained;

for each sample value of the plurality of sample values, it is determined whether the sample value is outside the predetermined range and, if the sample value is outside the predetermined range, a count on a counter is changed; and it is determined whether the count has reached a threshold count, and if the count has reached the threshold count, control is performed to place the switched mode power supply in the non-operational state.

9. The method according to claim 8, wherein to determine whether the feedback signal is outside the predetermined range a set of processes is performed iteratively, the set of processes comprising:

assigning a first value for incrementing the count if the count from a previous iteration is smaller than a reference count, and assigning the first value for decrementing the count if the count from the previous iteration is larger than the reference count;

obtaining a sample value of the feedback signal;

determining whether the sample value is outside the predetermined range and, if the sample value is outside the predetermined range, assigning a second value for changing the count, the second value being greater than the first value;

changing the count on the counter by the first value or the second value; and determining whether the count has reached the threshold count, and ceasing to iteratively perform the set of processes and performing control to place the switched mode power supply in the non-operational state, if the count is determined to have reached the threshold count.

10. The method according to claim 9, wherein the set of processes further comprises:

determining whether the switched mode power supply is starting up; and if the switched mode power supply is determined to be starting up and the sample value is determined to be outside the predetermined range, assigning a third value for changing the count, the third value being smaller than and of opposite sign to the second value.

11. The method according to claim 9, wherein the set of processes further comprises:

obtaining a sample value indicative of a temperature of the switched mode power supply; and if the sample value is determined to be outside the predetermined range, assigning a fourth value for changing the count.

12. The method according to any of claim 9, further comprising setting the count on the counter to an initial count prior to iteratively performing the set of processes, the initial count being different from the reference count.

* * * * *

UNITED STATES PATENT AND TRADEMARK OFFICE
CERTIFICATE OF CORRECTION

PATENT NO. : 9,214,804 B2  
APPLICATION NO. : 13/885040  
DATED : December 15, 2015  
INVENTOR(S) : Persson et al.

Page 1 of 1

It is certified that error appears in the above-identified patent and that said Letters Patent is hereby corrected as shown below:

In the Specification

In Column 1, Line 21, delete "MCSFET" and insert -- MOSFET --, therefor.

In Column 1, Line 27, delete "FIG. 1," and insert -- FIG. 1 --, therefor.

In Column 1, Line 46, delete "(and" and insert -- ($V_{out}$) and --, therefor.

In Column 2, Line 23, delete "converter 100" and insert -- converter 100☐ --, therefor.

In Column 2, Line 26, delete "converter 100." and insert -- converter 100⊔. --, therefor.

In Column 2, Line 59, delete "Threshold," and insert -- threshold, --, therefor.

In Column 3, Line 14, delete "or" and insert -- or a --, therefor.

In Column 8, Line 59, delete "IMPS." and insert -- SMPS. --, therefor.

In Column 9, Line 21, delete "then" and insert -- than --, therefor.

In Column 10, Line 16, delete "converter 100" and insert -- converter 100☐ --, therefor.

In Column 11, Line 47, delete "S330," and insert -- S350, --, therefor.

In Column 11, Line 56, delete "SS" and insert -- "SS" --, therefor.

In Column 12, Line 8, delete "load," and insert -- load --, therefor.

In the Claims

In Column 16, Line 23, in Claim 12, delete "to any of" and insert -- to --, therefor.

Signed and Sealed this  
Twelfth Day of July, 2016

Michelle K. Lee  
*Director of the United States Patent and Trademark Office*